United States Patent [19]

Inverso

[11] 4,098,659

[45] Jul. 4, 1978

[54] ELECTROCHEMICAL MILLING PROCESS TO PREVENT LOCALIZED HEATING

[75] Inventor: Anthony J. Inverso, Ogden, Utah

[73] Assignee: The United States of America as represented by the Secretary of the Air Force, Washington, D.C.

[21] Appl. No.: 815,134

[22] Filed: Jul. 13, 1977

[51] Int. Cl.² .......................... C25F 3/00; C25F 3/14
[52] U.S. Cl. ........................... 204/129.65; 204/129.1
[58] Field of Search ............... 204/129.1, 129.3, 129.5, 204/129.65

[56] References Cited

U.S. PATENT DOCUMENTS 3,560,357   2/1971   Shaw .............................. 204/129.65

FOREIGN PATENT DOCUMENTS 47-5955     5/1968   Japan ............................. 204/129.65
1,425,219   2/1976   United Kingdom ............. 204/129.65

Primary Examiner—T. M. Tufariello
Attorney, Agent, or Firm—Joseph E. Rusz; James S. Shannon

[57] ABSTRACT

A process for the electrochemical removal of a metal cover wherein the electrically nonconductive underlying material to be exposed cannot withstand elevated temperatures produced by hot spots or arcs in the material being removed. The item to be processed is first masked, completely covering the area which is to be in contact with the etching solution. Segments of protective maskant are then removed in strips of prescribed width and at specified time intervals to expose additional material. The sequence produces graduated depths in the material being etched away and eventually results in the underlying material being exposed in incremental strips. Appropriate selection of timing and exposure width retains adequate unmasked covering material to avoid local areas of high current density, while insuring a smoothly expanding etched exposure of the underlying material.

2 Claims, 4 Drawing Figures

ELECTROCHEMICAL MILLING PROCESS TO PREVENT LOCALIZED HEATING

RIGHTS OF THE GOVERNMENT

The invention described herein may be manufactured and used by or for the Government of the United States for all governmental purposes without the payment of any royalty.

BACKGROUND OF THE INVENTION

This invention relates to processes of electrochemical milling. More particularly, the invention addressed itself to electrochemical milling where the material being removed covers an electrically nonconductive material which cannot withstand elevated temperatures, such as an explosive or rocket propellant.

The process of electrochemical milling and the use of maskants in the application of such a process to prevent material removal and thereby prescribe the shape of the etch are all known in the prior art; see U.S. Pat. Nos. 1,376,365 and 3,380,863 and the subject Electrochemical Metal Removal in *VAN NOSTRAND'S SCIENTIFIC ENCYCLOPEDIA* copyright 1968. This process has been used to dissect solid propellant rocket motors, or other metal encased highly flammable materials, to allow analysis of the interior materials or structure. In the specific case which led to the invention disclosed herein, rocket motors were being periodically sampled and dissected to evaluate the effects of storage time and environment upon the propellant composition. Electrochemical milling was chosen because it is generally considered relatively safe and is less expensive than other metal removal techniques such as grinding.

The etching was generally performed by first completely covering the rocket motor case with a maskant, a moisture proof tape, and then removing adjacent circumferential or axial strips of the tape in succession, allowing the exposed metal beneath each strip to be completely etched away before the next strip was removed. Depending on the nature of the motor, such removal and etching would continue until either the whole case was etched away or just sufficiently to allow the case to be separated and propellant removed.

Although not to the extent encountered with the other metal removal techniques, the use of electrochemical milling has produced a significant number of accidental propellant ignitions, resulting in the destruction of the dissection equipment and risk of injury to facility personnel. Analysis of the ignition mechanisms and recognition of causes was not straight forward, in the normal sense, since the accidental ignitions followed no prescribed pattern, reasonable modifications in the electrochemical processes did not prevent ignitions and, foremost, once ignition occurred the reaction was so violent that very little of the hardware remained for analysis.

The forementioned attempts at modification involved reductions in the area exposed to the etching electrolyte solution at any one time, careful monitoring of the etching process, and changes in the electrical potential being applied. None proved to be entirely successful and accidental ignition would sometimes occur.

BRIEF SUMMARY OF THE INVENTION

According to the invention a process is disclosed by which a metallic solid propellant rocket motor case is removed by electrochemical milling without subjecting the underlying electrically nonconductive propellant to hot spots or arcs caused by characteristics of the etching process. The process involves sequentially exposing additional adjacent areas of the metal case to the etching process, each well before the previous exposed section is etched away to its full depth. This produces a stepped etching area several times larger than the area of a single strip so that as each strip area is finally etched completely through the metal, great increases in current density, which could cause hot spots or arcs, cannot occur. As the process continues, the area of completely removed metal gradually expands.

DETAILED DESCRIPTION OF THE INVENTION

The typical rocket motor consists of a long cylindrical metal case within which the propellant is cast. Dissection for purposes of analysis is normally performed by one of three general approaches: either the complete skin is etched off, a circumferential segment etched away and the ends pulled off the propellant, or axial strips etched away and the half-cylinder pieces separated.

In each of the above techniques the standard etching procedure is to expose strips of the case metal to be etched and continue the etch until the strips are completely removed. Typically the exposure width is one-eighth to two inches. The major deficiency has been the significant rate of accidental propellant ignitions caused by localized hot spots or arcs in the motor case material during etching.

The inventor's observations and analysis led him to recognize the problem as being related to a combination of two factors. First, the tendency of the case to be etched more rapidly near the edges of the exposed area, that being at the interface with the masked area of the case. Second, since the underlying material is electrically nonconductive electrical currents flowing from the electrolyte solution into the exposed areas of the case must eventually flow through conductive paths into the nonexposed sections of the motor case.

Figure 1:
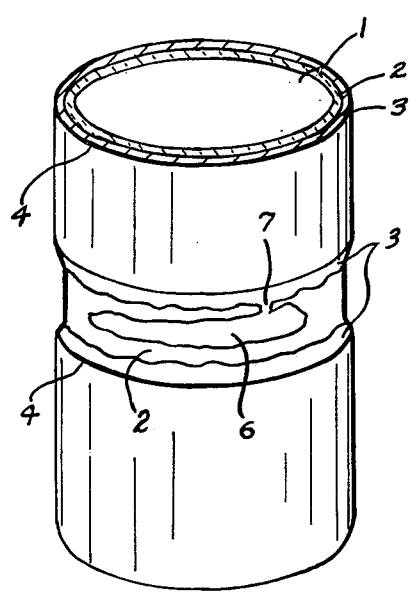
FIG. 1 shows a cross section of a rocket motor and the typical action of a wide circumferential etch area.

With the above factors in mind the etching process is amenable to analysis for potential causes of ignition. Consider FIG. 1, showing a wide circumferential etch nearing completion. Rocket motor propellant 1 is covered by a very thin insulation 2 and case 3. Maskant 4 in the form of moisture proof tape covers the nonexposed areas of the case. As is evident from the figure, the nature of the etching is to leave islands of thin conductive case material 6 which at some time near the end of the process are electrically connected to the nonexposed case through thin, narrow bridges like 7. As bridge 7 is etched away a point is reached when the current density in the bridge increases significantly and in a regenerative fashion the bridge disintegrates, because the bridge material resistively increases with temperature. When island area 6 is significantly larger than bridge 7 the energy dissipated in the melting of the bridge and the arc formed immediately thereafter is often sufficient to burn through thin insulation 2 and ignite propellant 1.

Figure 2:
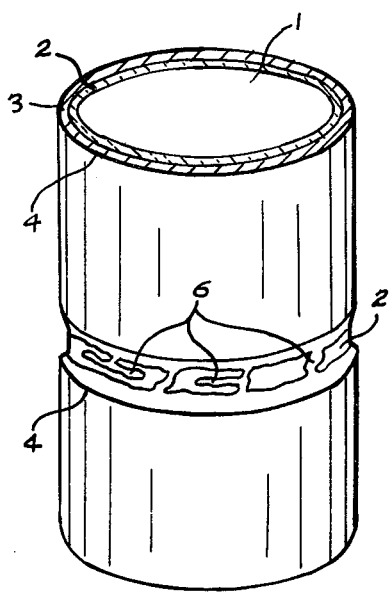
FIG. 2 shows the same motor with a narrow etch area.

FIG. 2 shows the results of the typical attempts to avoid ignition, before the actual cause of the ignition was recognized. Though a reduction in the case area exposed produces smaller current collecting islands 6, by the nature of the electrochemical process being used the current densities in the exposed areas rise, the bridges are etched away more rapidly with more of a tendency toward rapid disintegration, and the locally generated heat is more confined and therefore produces a higher temperature. As indicated before, such approaches were unsuccessful.

The present invention recognizes the above defined deficiencies and discloses a process for preventing accidental rocket propellant ignitions. Using the general etching apparatus shown schematically in FIG. 3, etching is begun with an elemental, and in this case circumferential, strip of exposed case of suitable width, for example, ½ inch. After a suitable period of etching, determined by the etching rate and the etching area desired before an elemental area etches completely through, an additional elemental width of circumferential tape maskant is removed. This is repeated until adequate exposure of underlying propellant occurs, without regard to the appearance of the etched surface or subjective elevation by the equipment operator at the tape removal intervals.

The apparatus used in this embodiment is comprised of the rocket motor 9 electrically attached to the positive side of power supply 12 at points 11. The power supply is designed to have a maximum capacity of 400 amps at 25 volts. The negative side of power supply 12 is connected to heavy copper ring electrode 13 which is submerged in brine (salt water) electrolyte solution 14 surrounding the rocket motor. Electrolyte container 16 sits upon supporting fixture 17 and is sealed at its lower end by inflatable rubber tube 18. The principal chemical reaction for this apparatus is $2Fe + 6 H_2O \rightarrow 2Fe(OH)_3 + 3H_2\uparrow$.

Figure 3:
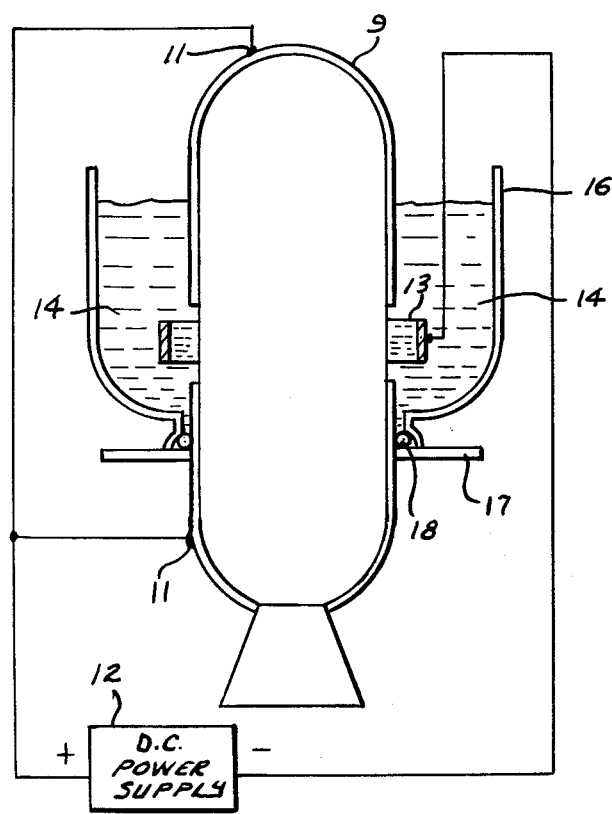
FIG. 3 is a schematic of the typical apparatus used to perform electrochemical milling of rocket motors.
Figure 4:
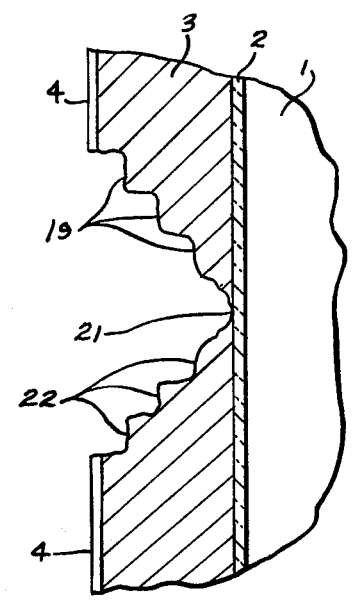
FIG. 4 is a magnified cross sectional view of the etching pattern when following the procedure disclosed herein.

Functionally the above-described process, when used in conjunction with the equipment shown in FIG. 3, produces an etch pattern as shown in FIG. 4. The etching proceeds into the metallic case in step-like graduations 19 and 22 until it reaches the surface of the propellant insulator material 2. As additional areas of maskant tape are removed, the graduations extend outward but generally retain their step-like shape. The area of propellant insulator material exposure 21 gradually expands. While shown in FIG. 4 as proceeding outward along two separate fronts 19 and 22, it will be recognized by those skilled in the art that the etching process, and the associated step-like graduations, can be restricted to only one front.

As may be evident to the reader, the above disclosed process has produced a smooth and controlled expansion of area 21, while simultaneously and continually exposing a large area of case material 19 to prevent high density electric current paths. An ancillary but often valuable benefit is the lack of subjective evaluation and potential error by operators during the etching process.

While the invention has been shown and described with reference to particular embodiment thereof, it will be understood by those skilled in the art that various changes in form and materials may be made without departing from the spirit and scope of the invention.

I claim:

1. A process for removing a metallic cover from an underlying nonconductive ignitible solid material comprising:
   a. coating the cover with a maskant;
   b. successively removing at regular intervals adjacent elemental areas of the maskant to incrementally expose the cover; and
   c. electrochemically removing a thickness of metal from the total exposed area of said cover during each interval that does not exceed a small fraction of the initial cover thickness.

2. The process of claim 1 in which said cover is the cylindrical case of a rocket motor, said material is the rocket propellant, and said elemental areas are strips around the circumference of the motor case.

* * * * *